United States Patent
Yama

[19]

[11] Patent Number: 6,104,770
[45] Date of Patent: Aug. 15, 2000

[54] APPARATUS OF DETECTING SYNCHRONIZATION SIGNAL AND METHOD OF DETECTING SYNCHRONIZATION SIGNAL

[75] Inventor: Takayuki Yama, Tokyo, Japan

[73] Assignee: NEC Corporation, Tokyo, Japan

[21] Appl. No.: 09/004,857

[22] Filed: Jan. 9, 1998

[30] Foreign Application Priority Data

Jan. 10, 1997 [JP] Japan ................................. 9-014537

[51] Int. Cl.[7] ................................. H04L 7/00; H04J 3/06
[52] U.S. Cl. .................... 375/368; 375/362; 375/365; 375/366; 375/367; 370/512; 370/513; 370/514
[58] Field of Search ..................... 375/368, 362, 375/365, 366, 367; 370/512, 513, 514

[56] References Cited

U.S. PATENT DOCUMENTS

| | | | |
|---|---|---|---|
| 4,675,886 | 6/1987 | Surie | 375/368 |
| 4,686,690 | 8/1987 | Sato | 375/365 |
| 5,003,560 | 3/1991 | Kim | 375/362 |
| 5,018,140 | 5/1991 | Lee et al. | 370/514 |
| 5,228,065 | 7/1993 | Herzberger | 375/366 |
| 5,710,774 | 1/1998 | Suh et al. | 370/513 |
| 5,862,143 | 1/1999 | Suh | 370/513 |

FOREIGN PATENT DOCUMENTS

| | | |
|---|---|---|
| 60-219835 | 11/1985 | Japan . |
| 61-257038 | 11/1986 | Japan . |
| 62-28621 | 6/1987 | Japan . |
| 62-213336 | 9/1987 | Japan . |
| 63-30039 | 2/1988 | Japan . |
| 63-262939 | 10/1988 | Japan . |
| 4-46840 | 2/1991 | Japan . |
| 5-276151 | 10/1993 | Japan . |
| 5-276153 | 10/1993 | Japan . |

*Primary Examiner*—Stephen Chin
*Assistant Examiner*—Paul N. Rupert
*Attorney, Agent, or Firm*—Foley & Lardner

[57] ABSTRACT

There is provided an apparatus for detecting a synchronizing signal, including a first circuit for extracting bit clocks from serial data received, a shift register for shifting the serial data bit by bit on the basis of the bit clocks, and latching the thus shifted serial data, a second circuit for counting the bit clocks, and generating word clocks in accordance with the number of count of the bit clocks for outputting parallel data, a third circuit for detecting a synchronization pattern from the serial data stored in the shift register, and generating a first synchronization-detecting signal, a fourth circuit for detecting a synchronization pattern from the parallel data, and generating a second synchronization-detecting signal, and a fifth circuit for determining whether frame synchronization is made, by the first and second synchronization-detecting signals, and generating a frame synchronization indication signal indicative of whether frame synchronization is made or not. The third and fourth circuits are switched in accordance with the frame synchronization indication signal. Even if a wrong synchronization pattern appears in serial data during data is transferred, the above-mentioned apparatus makes it possible to avoid wrong synchronization by judging whether frame synchronization is made or not, and switching the third and fourth circuits in accordance with the judgement.

19 Claims, 4 Drawing Sheets

APPARATUS OF DETECTING SYNCHRONIZATION SIGNAL AND METHOD OF DETECTING SYNCHRONIZATION SIGNAL

BACKGROUND OF THE INVENTION

1. Field of the Invention

The invention relates to an apparatus and a method of detecting a synchronization signal while serial data having a fixed frame length is being transferred in a data processing apparatus such as a computer.

2. Description of the Related Art

An apparatus or a method of detecting a synchronization signal has been conventionally employed to ensure frame synchronization for correctly convert received serial data into parallel data while serial data having a fixed frame length is being transferred in a data processing apparatus such as a computer.

FIG. 1 is a block diagram of one of conventional apparatuses of detecting a synchronization signal. A clock extracting circuit 2 extracts clock elements from received serial data SD, and emits bit clocks BC in synchronization with the serial data SD. A shift register 1 receives the bit clocks BC from the clock extracting circuit 2, and shifts the content thereof or the serial data SD bit by bit by virtue of the bit clocks BC. Thus, the serial data is converted into parallel data PD.

A synchronization pattern detecting circuit 4 checks whether a synchronization pattern is found in the parallel data PD emitted from the shift register 1. If found, the synchronization pattern detecting circuit 4 emits a synchronization-detecting signal SS1. A synchronization circuit 3 is provided with a counter (not illustrated) therein, by which the bit clocks BC emitted from the clock extracting circuit 2 is counted, and emits word clocks WC for outputting parallelized data. The counter mounted in the synchronization circuit 3 is reset on receiving the synchronization-detecting signal, and compensates for a phase of the word clocks WC so that the parallel data PD is output on the basis of the synchronization pattern.

A latch 5 latched the content of the shift register 1 when the word clocks WC are received, and emits the parallel data PD.

Hereinbelow is explained an operation of the above-mentioned conventional synchronization signal detecting apparatus. The received serial data SD is input into the shift register 1 bit by bit in synchronization with the bit clocks BC emitted from the clock extracting circuit 2. The synchronization pattern detecting circuit 4 emits the synchronization-detecting signal SS1 when the content of the shift register 1 is in accord with the synchronization pattern.

The synchronization circuit 3 counts the bit clocks BC, and emits the word clocks WC in accordance with the count. When the synchronization circuit 3 receives the synchronization-detecting signal SS1 from the synchronization pattern detecting circuit 4, the counter (not illustrated) which counts the bit clocks BC is reset to thereby compensate for a phase of the word clocks WC. Thereafter, the latch 5 emits the content of the shift register 1 as the parallel data PD.

In the above-mentioned conventional apparatus of detecting a synchronization signal, if a wrong synchronization pattern caused by bit error and so on appears in a serial data while the serial data having a fixed frame length is being transferred, the apparatus could not distinguish a wrong synchronization pattern from a correct one. This results in a problem that the apparatus recognizes the wrong synchronization pattern as a correct one, and hence, correct parallel data is not emitted.

The reason of this is that the above-mentioned conventional apparatus of detecting a synchronization signal does have neither means for judging whether a synchronization pattern found in serial data is correct or wrong nor means for judging whether frame synchronization is established or not.

U.S. Pat. No. 5,228,065 has suggested an arrangement for producing a synchronizing pulse wherein a synchronizing pulse is produced on detection of a frame codeword or frame-structured binary signal consisting of a first word repeated a plurality of times and at least one second word. A demultiplexer divides the incoming signal into N words which are advanced in parallel through N shift registers of a first memory matrix, followed by the next N words, and so on. A decoder determines whether the first word is stored in each register, and increments a respective one of N counters when the word is found. An addressing logic transforms the output into a binary number which controls a multiplexer which, in turn controls arrangement of bits in a second memory matrix. A synchronizing pulse is produced when the second memory matrix contains predetermined bits of the first and second word.

Japanese Unexamined Patent Publication No. 60-219835 has suggested a frame synchronizing circuit. The circuit is employed for a multiplexer for multiplying a plurality of low-speed data signals into a single high-speed data signal and dividing a single high-speed data signal into a plurality of low-speed data signals, and used when a single high-speed data signal is divided into a plurality of low-speed data signals. The circuit includes a first circuit for emitting a signal representing a position of a frame synchronization signal in the high-speed data signals, a second circuit for extracting a frame synchronization signal out of the high-speed data signals by virtue of a signal emitted from the first circuit, a third circuit for judging whether a signal extracted in the second circuit is a correct frame synchronization signal, and a fourth circuit for counting the number of outputs from the third circuit, and judging that frame synchronization is established when the count is over a first threshold value and that frame synchronization is broken when the count is over a second threshold value. The first circuit is made to stop in a predetermined condition, while the frame synchronization is not established, until the frame synchronization signal is detected out of the high-speed data signals, and is forced to start when the frame synchronization signal is detected. The first circuit is also made to stop in a predetermined condition when a signal having been extracted out of the high-speed data signals is not a correct frame synchronization signal. The third and fourth circuits are constituted in a single microprocessor.

Japanese Unexamined Patent Publication No. 61-257038 has suggested a frame synchronization circuit including a serial/parallel converting circuit for converting a single high-speed data having a bit rate of $f_0$ into n parallel data each having a bit rate of $f_0/n$, a phase-shifting circuit for the parallel data into n-phase parallel data, n frame synchronization signal extracting circuits for extracting a frame synchronization signal for each of the n-phase parallel data, a frame position pulse generating circuit for generating a frame position pulse representing a position of the frame synchronization signal by virtue of bit clocks having a bit rate of $f_0/n$, n judgement circuits for judging whether a signal having been extracted by the frame synchronization signal extracting circuit is a correct frame pulse by virtue of the frame position pulse, n counter circuits for counting outputs from the judgement circuits, and judging that frame synchronization is established when positive outputs are over a first threshold value and that frame synchronization is broken when negative outputs are over a second threshold value, and a control circuit for stopping the frame position pulse generating circuit when frame synchronization is broken, and starting the frame position pulse generating circuit when the extracted signal is detected.

Japanese Patent Publication No. 62-28621 has suggested a synchronization circuit including first means for converting a time series data pulse signal containing a synchronization pattern having a plurality of bits into a plurality of parallel phase signal series, and second means for judging whether the parallel phase signal series are synchronization patterns. The synchronization circuit monitors from which phase signal series is detected a synchronization pattern at every synchronization pattern period, to thereby establish frame synchronization.

Similarly, Japanese Unexamined Patent Publications Nos. 62-213336, 63-30039, 63-262939, 3-46840, 5-276151, and 5-276153 have suggested an apparatus or a circuit for detecting a synchronization signal to thereby establish frame synchronization.

SUMMARY OF THE INVENTION

In view of the foregoing problems of the prior art, it is an object of the present invention to provide an apparatus and a method of detecting a synchronization signal, both of which are capable of avoiding wrong synchronization, even if a wrong synchronization pattern appears in serial data while the serial data is being transferred.

In brief, there is provided an apparatus and a method of detecting a synchronization signal wherein detection of a synchronization pattern is switched in accordance with whether frame synchronization is established or not.

Specifically, in one aspect of the invention, there is provided an apparatus for detecting a synchronizing signal, including (a) a clock extracting circuit for extracting bit clocks from serial data received in the apparatus, (b) a shift register for shifting the serial data bit by bit on the basis of the bit clocks, and latching the thus shifted serial data, (c) a synchronization circuit for counting the bit clocks, and generating word clocks in accordance with the number of count of the bit clocks for outputting parallel data, (d) a first synchronization pattern detecting circuit for detecting a synchronization pattern from the serial data stored in the shift register, and generating a first synchronization-detecting signal, (e) a second synchronization pattern detecting circuit for detecting a synchronization pattern from the parallel data, and generating a second synchronization-detecting signal, and (f) a frame synchronization detecting circuit for determining whether frame synchronization is made, by the first and second synchronization-detecting signals, and generating a frame synchronization indication signal indicative of whether frame synchronization is made or not, wherein the first and second synchronization pattern detecting circuits are switched in accordance with the frame synchronization indication signal.

For instance, the first synchronization pattern detecting circuit may be enabled to detect a synchronization pattern from the serial data, when frame synchronization is not made, and the second synchronization pattern detecting circuit may be enabled to detect a synchronization pattern from the parallel data, when frame synchronization is made.

It is preferable for the above-mentioned apparatus to further include at least one circuit for controlling on/off of input into the first and second synchronization pattern detecting circuits to switch the first and second synchronization pattern detecting circuits in accordance with whether frame synchronization is established or not. It is also preferable for the above-mentioned apparatus to further include a latch circuit for latching the content of the shift register with the word clocks to generate parallel data.

There is further provided an apparatus for detecting a synchronizing signal, including (a) a first synchronization pattern detecting circuit for detecting a synchronization pattern on the basis of the content of a shift register which shifts received serial data in accordance with of bit clocks extracted from the received serial data, (b) a second synchronization pattern detecting circuit for detecting a synchronization pattern from parallel data generated by latching the content of the shift register with word clocks generated each time when the predetermined number of the bit clocks is counted, and (c) a frame synchronization detecting circuit for monitoring an interval between detection of synchronization patterns, and generating a frame synchronization indication signal on judging that frame synchronization is made. The first and second synchronization pattern detecting circuits are switched so that the first synchronization pattern detecting circuit is made valid when frame synchronization is not made and the second synchronization pattern detecting circuit is made valid when frame synchronization is made. The frame synchronization detecting circuit is designed to receive a synchronization-detecting signal emitted from the first or second synchronization pattern detecting circuit which is made valid, to thereby monitor an interval between detection of synchronization patterns.

For instance, the frame synchronization detecting circuit may be designed to count the number of the word clocks from first receipt of the synchronization-detecting signal until second receipt of the synchronization-detecting signal, and makes judgement that frame synchronization is made only when the counted number of the word clocks is equal to the number of word clocks corresponding to one frame.

There is still further provided an apparatus for detecting a synchronizing signal, including (a) a clock extracting circuit for extracting bit clocks from serial data received in the apparatus, (b) a shift register for shifting the serial data bit by bit on the basis of the bit clocks, (c) a synchronization circuit for counting the bit clocks, and generating word clocks in accordance with the number of count of the bit clocks, (d) a first synchronization pattern detecting circuit for detecting a synchronization pattern from the content of the shift register, and generating a first synchronization-detecting signal, (e) a latch circuit for latching the content of the shift register with the word clock to generate parallel data, (f) a second synchronization pattern detecting circuit for detecting a synchronization pattern from the parallel data, and generating a second synchronization-detecting signal, and (g) a frame synchronization detecting circuit for monitoring an interval between detection of synchronization patterns, and generating a frame synchronization indication signal when judging frame synchronization is made. The first and second synchronization pattern detecting circuits are switched so that the first synchronization pattern detecting circuit is made valid when frame synchronization is not made and the second synchronization pattern detecting circuit is made valid when frame synchronization is made. The frame synchronization detecting circuit is designed to receive a synchronization-detecting signal emitted from the first or second synchronization pattern detecting circuit which is made valid, to thereby monitor an interval between detection of synchronization patterns.

There is yet further provided an apparatus for detecting a synchronizing signal, including (a) a clock extracting circuit for extracting bit clocks from serial data received in the apparatus, (b) a shift register for shifting the serial data bit by bit on the basis of the bit clocks, (c) a synchronization circuit for counting the bit clocks, and generating word clocks in accordance with the number of count of the bit clocks, (d) a first synchronization pattern detecting circuit for detecting a synchronization pattern from the content of the shift register, and generating a first signal, (e) a latch circuit for latching the content of the shift register with the word clock to generate parallel data, (f) a second synchronization pattern detecting circuit for detecting a synchronization pattern from the parallel data, and generating a second signal, (g) a frame synchronization detecting circuit for determining whether frame synchronization is made or not, by first and second synchronization-detecting signals, and generating a frame synchronization indication signal indicative of whether frame synchronization is made or not, (h) a first AND circuit receiving the first signal and an inverted signal of the frame synchronization indication signal, and generating the first synchronization-detecting signal, (i) a second AND circuit receiving the second signal and the frame synchronization indication signal, and generating the second synchronization-detecting signal, and (j) an OR circuit receiving the first and second synchronization-detecting signals, and generating an output signal to the frame synchronization detecting circuit. The first and second synchronization pattern detecting circuits are switched in accordance with the frame synchronization indication signal.

It is preferable that the frame synchronization detecting circuit may be designed to monitor an interval between detection of synchronization patterns, and generates the frame synchronization indication signal when judging that frame synchronization is made. It is also preferable that the frame synchronization detecting circuit is designed to count the number of the word clocks from first receipt until second receipt of the first or second synchronization-detecting signal, and to make judgement that frame synchronization is made only when the counted number of the word clocks is equal to the number of word clocks corresponding to one frame.

There is still yet further provided an apparatus for detecting a synchronizing signal, including (a) a clock extracting circuit for extracting bit clocks from serial data received in the apparatus, (b) a shift register for shifting the serial data bit by bit on the basis of the bit clocks, (c) a synchronization circuit for counting the bit clocks, and generating word clocks in accordance with the number of count of the bit clocks, (d) a first synchronization pattern detecting circuit for detecting a synchronization pattern from the content of the shift register, and generating a first synchronization pattern detecting signal, (e) a latch circuit for latching the content of the shift register with the word clock to generate parallel data, (f) a second synchronization pattern detecting circuit for detecting a synchronization pattern from the parallel data, and generating a second synchronization pattern detecting signal, (g) a frame synchronization detecting circuit for determining whether frame synchronization is made or not, by the first and second synchronization-detecting signals, and generating a frame synchronization indication signal indicative of whether frame synchronization is made or not, (h) a first input controlling circuit for enabling or disabling the content of the shift register to be transmitted into the first synchronization pattern detecting circuit in accordance with an inverted signal of the frame synchronization indication signal, (i) a second input controlling circuit for enabling or disabling the parallel data to be transmitted into the second synchronization pattern detecting circuit in accordance with the frame synchronization indication signal, and (j) an OR circuit receiving the first and second synchronization-detecting signals, and generating an output signal to the frame synchronization detecting circuit. The first and second synchronization pattern detecting circuits are switched in accordance with the frame synchronization indication signal.

In another aspect of the invention, there is provided a method of detecting a synchronizing signal, including the steps of (a) attempting to detect a synchronization pattern from a received serial data, (b) emitting a first synchronization-detecting signal, if a synchronization pattern is detected, (c) monitoring an interval between subsequent first synchronization-detecting signals to judge whether frame synchronization is made or not, (d) attempting to detect a synchronization pattern from parallel data derived from the serial data, (e) emitting a second synchronization-detecting signal, if frame synchronization is made, and (f) monitoring an interval between subsequent second synchronization-detecting signals to judge whether frame synchronization is made or not.

For instance, the steps (a) to (f) may be repeated, if frame synchronization is judged not to be made in the steps (c) and (f). Similarly, the steps (d) to (f) may be repeated, if frame synchronization is judged to be made in the step (f).

In accordance with the above-mentioned present invention, it is possible to avoid wrong synchronization from being established due to a wrong synchronization pattern appearing while data is being transferred, and accordingly it is possible to avoid wrong data from being transferred. The present invention makes it possible to establish synchronization, only when a synchronization pattern is found at a correct interval.

In addition, since the present invention detects frame synchronization, it is possible to omit means or a step for judging whether synchronization is maintained in subsequent means or steps. This is because the frame synchronization detecting circuit monitors an interval between synchronization-detecting signals.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 1:
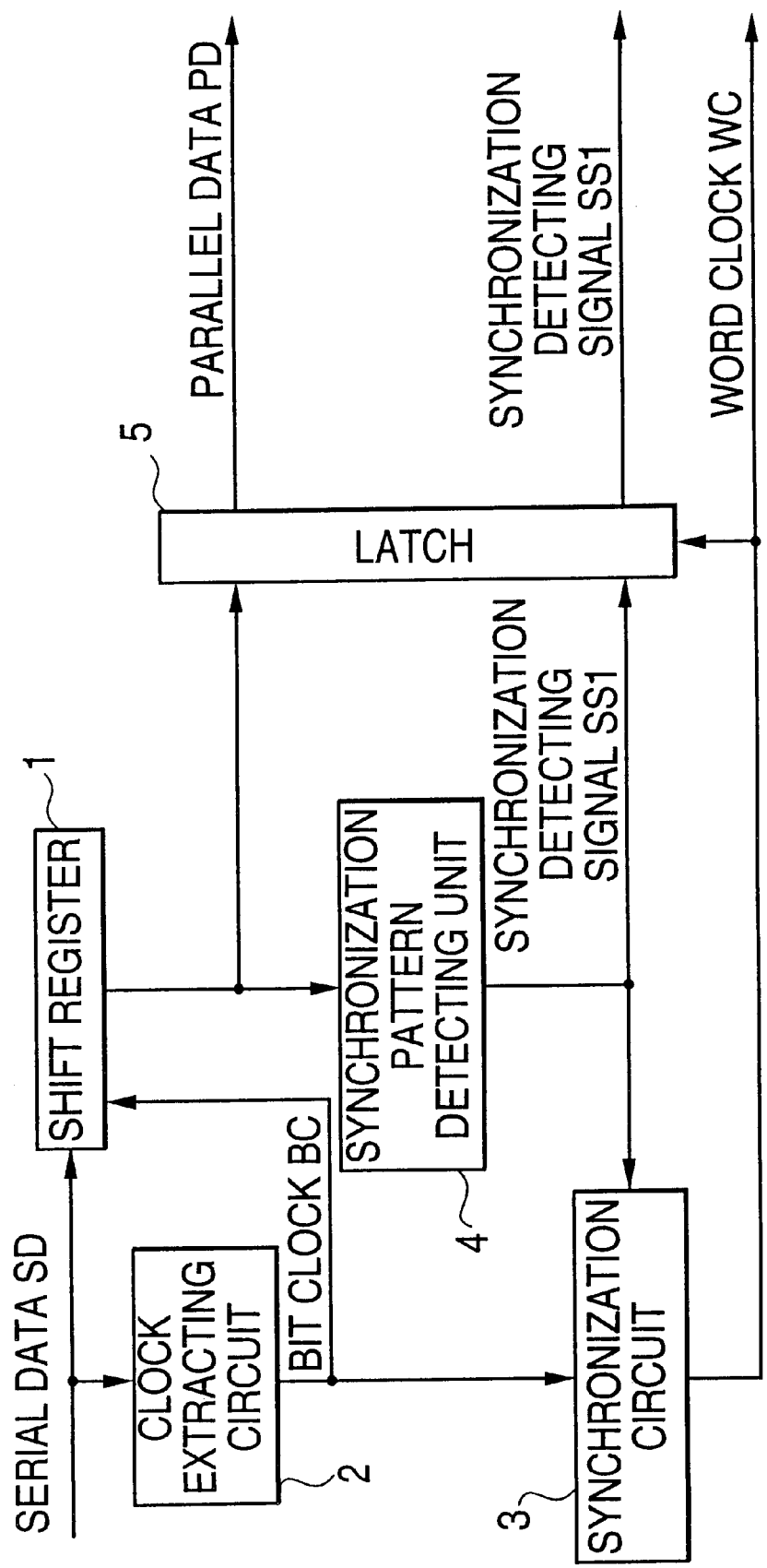
FIG. 1 is a block diagram of a conventional apparatus of detecting a synchronization signal.
Figure 2:
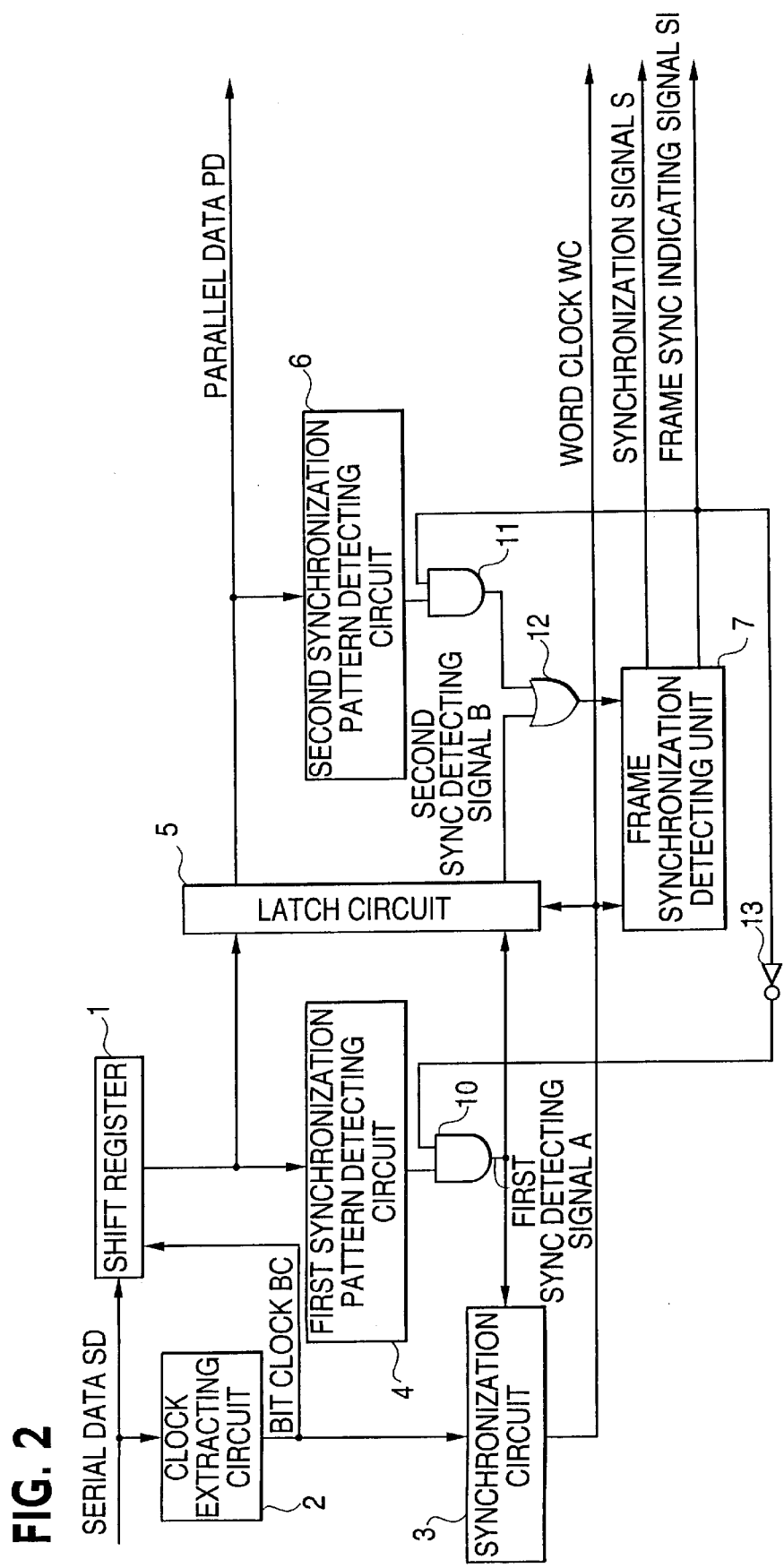
FIG. 2 is a block diagram of an apparatus of detecting a synchronization signal in accordance with the first embodiment.

With reference to FIG. 2, received serial data SD is input to both a shift register 1 and a clock extracting circuit 2. The clock extracting circuit 2 extracts clock elements from the serial data SD, and produces bit clocks BC in synchronization with the serial data SD. The shift register 1 receives the bit clocks BC from the clock extracting circuit 2, and shifts the content thereof by virtue of the bit clocks BC to thereby latch the serial data SD bit by bit.

A first synchronization pattern detecting circuit 4 turns a synchronization detecting flag on, if the content of the shift register 1 is in accord with a synchronization pattern. The synchronization detecting flag as an output from the first synchronization pattern detecting circuit 4 is input into a first AND circuit 10. When a later mentioned frame synchronization indication signal is off, namely, frame synchronization is not established, the first AND circuit 10 emits the output emitted from the first synchronization pattern detecting circuit 4 as it is, as a first synchronization-detecting signal A.

A synchronization circuit 3 is provided with a counter (not illustrated) therein, by which the bit clocks BC emitted from the clock extracting circuit 2 is counted, and emits word clocks WC in accordance with the count. When the synchronization circuit 3 receives the synchronization-detecting signal A from the AND circuit 10, the counter is reset to thereby compensate for a phase of the word clocks WC so that a later mentioned parallel data PD is latched in correct division.

A latch circuit 5 latches the content of the shift register 1 by virtue of the word clocks WC emitted from the synchronization circuit 3, and emits the thus latched content of the shift register 1 as parallel data PD.

A second synchronization pattern detecting circuit 6 turns a synchronization detecting flag on, if the content of the parallel data PD emitted from the latch circuit 5 is in accord with a synchronization pattern. The synchronization detecting flag as an output from the second synchronization pattern detecting circuit 6 is input into a second AND circuit 11. When the frame synchronization indication signal is on, namely, frame synchronization is established, the second AND circuit 11 emits the output emitted from the second synchronization pattern detecting circuit 6 as it is, as a second synchronization-detecting signal B.

The latch circuit 5 also latches the first synchronization-detecting signal A, and synchronizes the first synchronization-detecting signal A with the second synchronization-detecting signal B. The first synchronization-detecting signal A emitted from the latch circuit 5 is input into a later mentioned frame synchronization detecting circuit 7 through an OR circuit 12.

The frame synchronization detecting circuit 7 compares either an interval between the first synchronization-detecting signals A with the count of the word clocks WC when frame synchronization is not established, or an interval between the second synchronization-detecting signals B with the count of the word clocks WC when frame synchronization is established, to thereby judge whether frame synchronization is established or not. If frame synchronization is established, the frame synchronization detecting circuit 7 emits a frame synchronization indicating signal SI. Whether frame synchronization is established or not is judged as follows. The clock (not illustrated) provided in the synchronization circuit 3 for counting the word clocks WC is reset, when the frame synchronization detecting circuit 7 receives the first or second synchronization-detecting signal A or B. If a count shown by the counter when the frame synchronization detecting circuit 7 receives the next first and second synchronization-detecting signal A or B is equal to one frame length, the frame synchronization detecting circuit 7 judges that frame synchronization is established, and at the same time, reset the counter for the next comparison.

The frame synchronization detecting circuit 7 keeps the frame synchronization indicating signal SI on only while frame synchronization is kept established, and keeps the signal SI off while frame synchronization is not established. The frame synchronization indicating signal SI emitted from the frame synchronization detecting circuit 7 is input into the second AND circuit 11. In addition, the frame synchronization indicating signal SI is inverted by an inversion circuit 13, and the thus inverted signal SI is input into the first AND circuit 10. Thus, the first or second synchronization pattern detecting circuit 4 or 6 is enabled to emit a valid output in accordance with on/off of the frame synchronization indicating signal SI.

Figure 3:
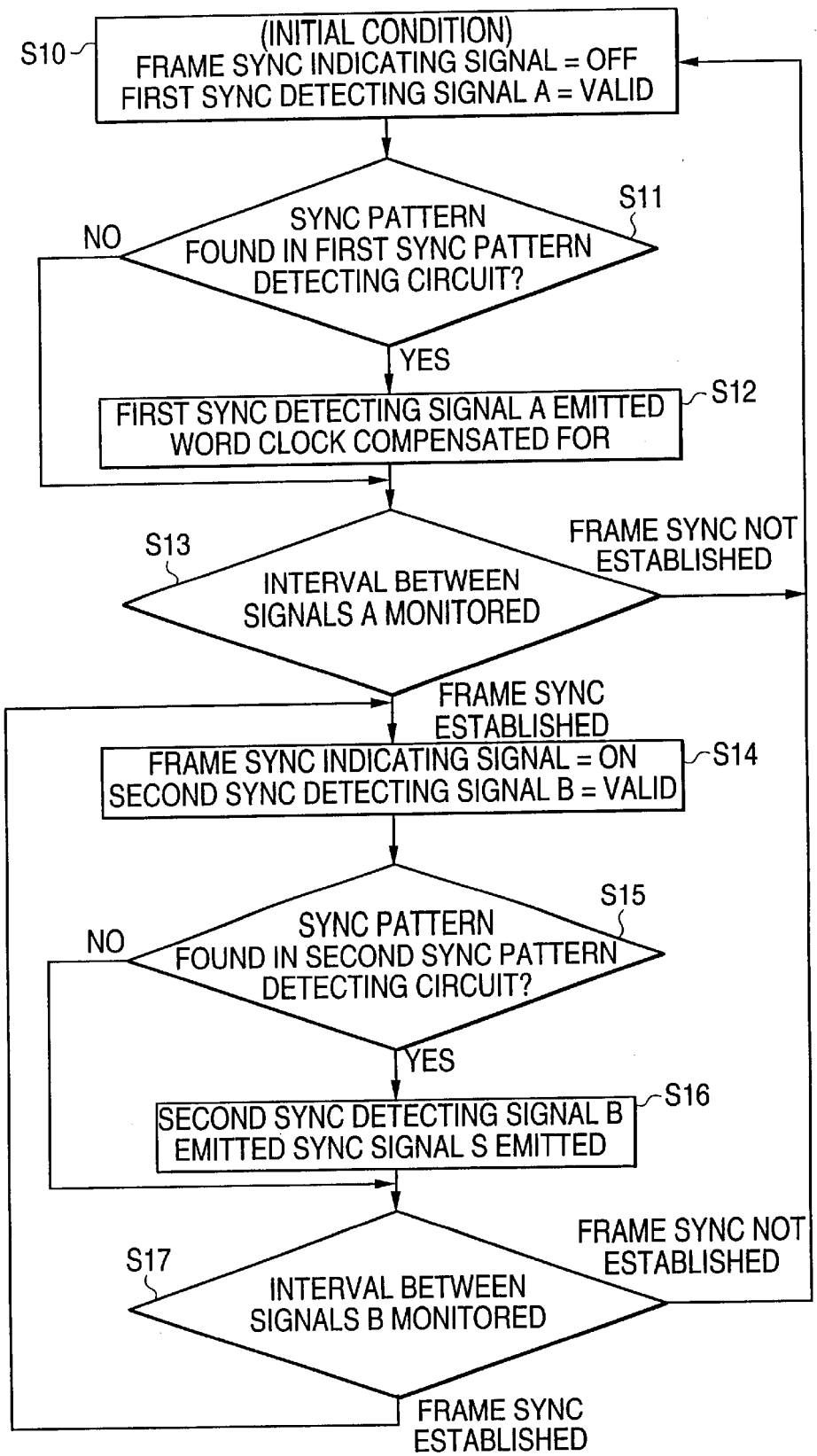
FIG. 3 is a flow chart illustrating an operation of the apparatus in accordance with the first embodiment.

FIG. 3 is a flow chart of the operation of the above-mentioned apparatus in accordance with the first embodiment. Hereinbelow is explained the operation of the above-mentioned apparatus with reference to FIGS. 2 and 3.

In initial condition, since frame synchronization is not established, the frame synchronization indicating signal SI is kept off. Accordingly, the first synchronization-detecting signal A emitted from the first synchronization pattern detecting circuit 4 is validly used for detection of a synchronization pattern, as shown in step 10.

The clock extracting circuit 2 generates the bit clocks BC when the serial data SD is received.

The shift register 1 shifts the content thereof bit by bit by virtue of the bit clocks BC to thereby latch the serial data SD. If the content of the shift register 1 is in accord with a synchronization pattern, the first synchronization pattern detecting circuit 4 detects that synchronization pattern, as shown in step 11. Then, the first synchronization pattern detecting circuit 4 turns a synchronization detecting flag on.

Since the frame synchronization indicating signal SI is off, the first AND circuit 10 emits the first synchronization-detecting signal A. When the first synchronization-detecting signal A is input into the synchronization circuit 3 counting the bit clocks BC and emitting the word clocks WC in accordance with the count of the bit clocks BC, the counter (not illustrated) incorporated in the synchronization circuit 3 is made to reset. Thus, a phase of the word clocks WC is compensated for so that the phase is based on the synchronization pattern, as shown in step 12. It should be noted that since the first synchronization-detecting signal A is not emitted while frame synchronization is established, namely, the frame synchronization indicating signal is on, the phase of the word clocks WC are not wrongly compensated for, even if a wrong synchronization pattern appears in the serial data SD. The content of the shift register 1 is latched into the latch circuit 5 by virtue of the word clocks WC, and subsequently emitted as the parallel data PD.

The first synchronization-detecting signal A is once latched in the latch circuit 5 and then input into the frame synchronization detecting circuit 7 in order to time with the second synchronization-detecting signal B emitted from the second synchronization pattern detecting circuit 6.

The frame synchronization detecting circuit 7 counts the word clocks WC from first receipt until second receipt of the first synchronization-detecting signal A, and uses the count of the word clocks WC to thereby judge whether an interval between the firstly and secondly received signals A is equal to one frame length. That is, the frame synchronization detecting circuit 7 monitors an interval between the first synchronization-detecting signals A, as shown in step 13.

The frame synchronization detecting circuit 7 sets the frame synchronization indicating signal SI on, if the monitored interval is equal to one frame length. On the other hand, the circuit 7 keeps the frame synchronization indicating signal SI off, if the monitored interval is not equal to one frame length, and waits for next first synchronization-detecting signals A.

When the frame synchronization indicating signal SI is turned on, the second synchronization pattern detecting circuit 6 is enabled to operate, and emit a synchronization signal in synchronization with a synchronization pattern emitted as the parallel data PD.

The second synchronization pattern detecting circuit 6 attempts to detect a synchronization pattern in the parallel data PD emitted from the latch circuit 5. If a synchronization pattern is found in the parallel data PD, the second synchronization pattern detecting circuit 6 detects the synchronization pattern, as shown in step 15, and turns a synchronization detecting flag on.

Since the frame synchronization indicating signal is on, the second AND circuit 11 emits the second synchronization-detecting signal B, as shown in step 16.

The thus emitted second synchronization-detecting signal B is input into the frame synchronization detecting circuit 7, and the frame synchronization detecting circuit 7 monitors an interval between the second synchronization-detecting signals B, as shown in step 17. If the thus monitored interval is equal to a frame length, the frame synchronization detecting circuit 7 judges that frame synchronization is established. Then, the frame synchronization detecting circuit 7 emits a synchronization signal S, and sets the frame synchronization indicating signal SI on. If the monitored interval is not equal to a frame length, the frame synchronization detecting circuit 7 judges that frame synchronization is not established, and sets the frame synchronization indicating signal SI off. Thus, the process is returned to the initial condition as shown in step 10. Then, the above-mentioned process is repeated.

In accordance with the above-mentioned first embodiment, whether frame synchronization is established or not is judged by monitoring an interval between the first or second synchronization-detecting signals A or B input into the frame synchronization detecting circuit 7. Accordingly, if a wrong synchronization signal in the serial data SD because of a bit error while the serial data SD is being transferred, the frame synchronization detecting circuit 7 detects that an interval between the synchronization patterns is not equal to a frame length, resulting in that it is possible to avoid wrong synchronization.

Second Embodiment

Figure 4:
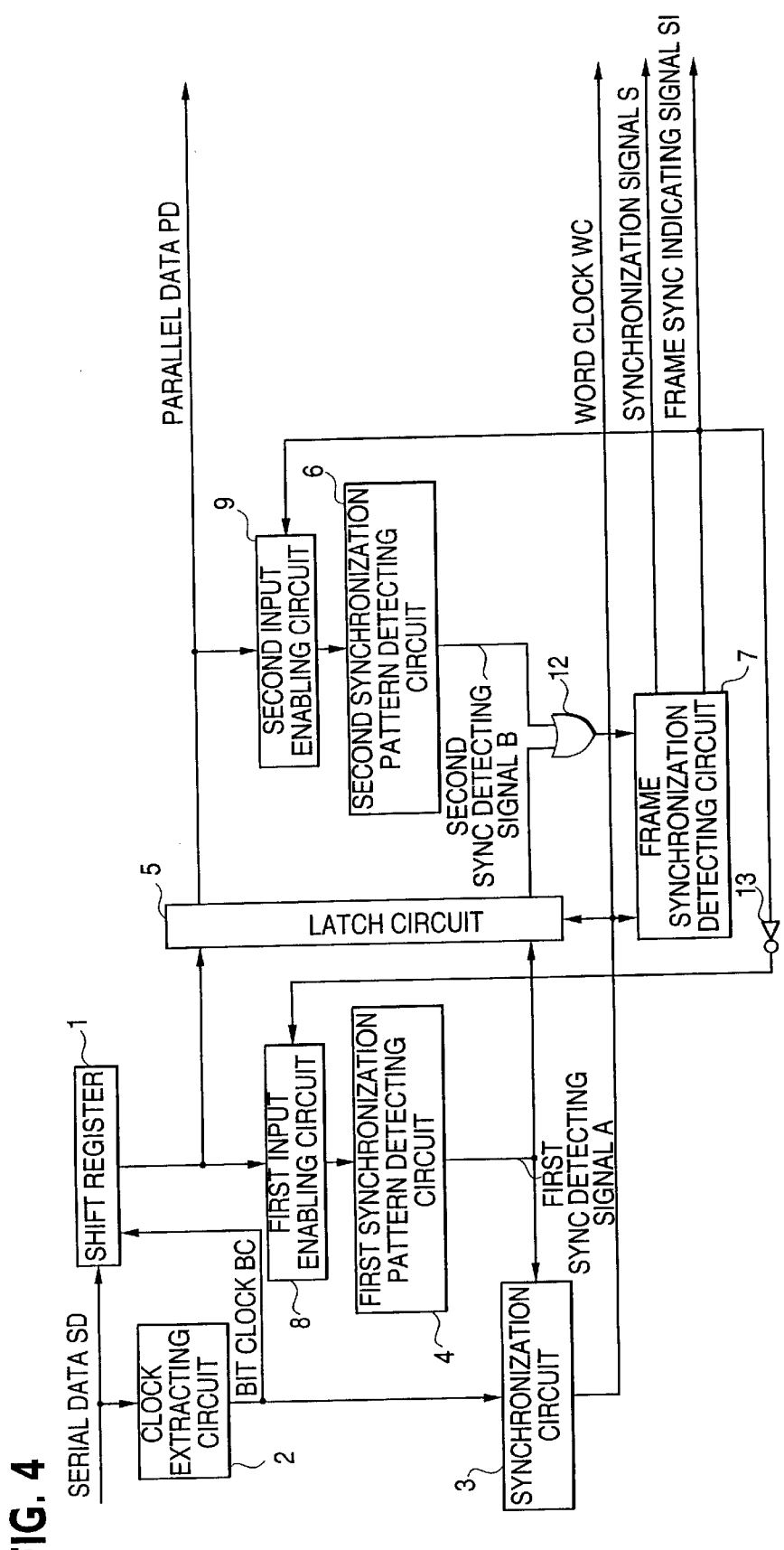
FIG. 4 is a block diagram of an apparatus of detecting a synchronization signal in accordance with the second embodiment.

An apparatus of detecting a synchronization signal in accordance with the second embodiment is explained hereinbelow with reference to FIG. 4.

The apparatus in accordance with the second embodiment is different from the apparatus in accordance with the first embodiment only in that it has first and second input enabling circuits 8 and 9 in place of the first and second AND circuits 10 and 11. The first and second input enabling circuits 8 and 9 are positioned upstream of the first and second synchronization pattern detecting circuits 4 and 6, respectively.

In the second embodiment, the first synchronization-detecting signal A is emitted from the first synchronization pattern detecting circuit 4, and is input directly into both the synchronization circuit 3 and the latch circuit 5. The second synchronization-detecting signal B is emitted from the second synchronization pattern detecting circuit 6, and is input directly into the OR circuit 12.

The first input enabling circuit 8 controls the transfer of the content of the shift register 1 to the first synchronization pattern detecting circuit 4. Specifically, the first input enabling circuit 8 enables or disables the content of the shift register 1 to be transferred to the first synchronization pattern detecting circuit 4 in accordance with the frame synchronization indicating signal SI emitted from the frame synchronization detecting circuit 7 and then inverted by the inversion circuit 13. Similarly, the second input enabling circuit 9 controls the transfer of the parallel data PD emitted from the latch circuit 5, to the second synchronization pattern detecting circuit 6. Specifically, the second input enabling circuit 9 enables or disables the parallel data PD to be transferred to the second synchronization pattern detecting circuit 6 in accordance with the frame synchronization indicating signal SI emitted from the frame synchronization detecting circuit 7.

If frame synchronization is not established, the first input enabling circuit 8 is turned on, and as a result, the content of the shift register 1 is input into the first synchronization pattern detecting circuit 4. On the other hand, if frame synchronization is established, the second input enabling circuit 9 is turned on, and as a result, the parallel data PD is input into the second synchronization pattern detecting circuit 6 from the latch circuit 5.

The apparatus in accordance with the second embodiment provides the same advantages as those obtained by the above-mentioned first embodiment. In addition, the second synchronization pattern detecting circuit 6 is controlled to be not in operation while frame synchronization is not established, whereas the first synchronization pattern detecting circuit 4 is controlled to be not in operation while frame synchronization is established by means of the first and second input enabling circuits 8 and 9 which control inputs into the first and second synchronization pattern detecting circuits 4 and 6. Hence, the second embodiment provides an additional advantage that electric power consumption can be reduced.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-14537 filed on Jan. 10, 1997 including specification, claims, drawings and summary is incorporated herein by reference in its entirety.

What is claimed is:

1. An apparatus for detecting a synchronizing signal, comprising:

(a) a clock extracting circuit for extracting bit clocks from serial data received in said apparatus;

(b) a shift register for shifting said serial data bit by bit on the basis of said bit clocks, and latching the thus shifted serial data;

(c) a synchronization circuit for counting said bit clocks, and generating word clocks in accordance with the number of count of said bit clocks for outputting parallel data;

(d) a first synchronization pattern detecting circuit for detecting a synchronization pattern from said serial data stored in said shift register, and generating a first synchronization-detecting signal;

(e) a second synchronization pattern detecting circuit for detecting a synchronization pattern from said parallel data, and generating a second synchronization-detecting signal; and (f) a frame synchronization detecting circuit for determining whether frame synchronization is made, by said first and second synchronization-detecting signals, and generating a frame synchronization indication signal indicative of whether frame synchronization is made or not, wherein said first and second synchronization pattern detecting circuits are switched in accordance with said frame synchronization indication signal.

2. The apparatus as set forth in claim 1, wherein said first synchronization pattern detecting circuit is enabled to detect a synchronization pattern from said serial data, when frame synchronization is not made, and said second synchronization pattern detecting circuit is enabled to detect a synchronization pattern from said parallel data, when frame synchronization is made.

3. The apparatus as set forth in claim 1, further comprising at least one circuit for controlling on/off of input into said first and second synchronization pattern detecting circuits to switch said first and second synchronization pattern detecting circuits in accordance with whether frame synchronization is made or not.

4. The apparatus as set forth in claim 1, further comprising a latch circuit for latching the content of said shift register with said word clocks to generate parallel data.

5. An apparatus for detecting a synchronizing signal, comprising:

(a) a first synchronization pattern detecting circuit for detecting a synchronization pattern on the basis of the content of a shift register which shifts received serial data in accordance with of bit clocks extracted from said received serial data;

(b) a second synchronization pattern detecting circuit for detecting a synchronization pattern from parallel data generated by latching the content of said shift register with word clocks generated each time when the predetermined number of said bit clocks is counted; and (c) a frame synchronization detecting circuit for monitoring an interval between detection of synchronization patterns, and generating a frame synchronization indication signal on judging that frame synchronization is made;

said first and second synchronization pattern detecting circuits being switched so that said first synchronization pattern detecting circuit is made valid when frame synchronization is not made and said second synchronization pattern detecting circuit is made valid when frame synchronization is made, said frame synchronization detecting circuit receiving a synchronization-detecting signal emitted from said first or second synchronization pattern detecting circuit which is made valid, to thereby monitor an interval between detection of synchronization patterns.

6. The apparatus as set forth in claim 5, wherein said frame synchronization detecting circuit counts the number of said word clocks from first receipt of said synchronization-detecting signal until second receipt of said synchronization-detecting signal, and makes judgement that frame synchronization is made only when the counted number of said word clocks is equal to the number of word clocks corresponding to one frame.

7. An apparatus for detecting a synchronizing signal, comprising:

(a) a clock extracting circuit for extracting bit clocks from serial data received in said apparatus;

(b) a shift register for shifting said serial data bit by bit on the basis of said bit clocks;

(c) a synchronization circuit for counting said bit clocks, and generating word clocks in accordance with the number of count of said bit clocks;

(d) a first synchronization pattern detecting circuit for detecting a synchronization pattern from the content of said shift register, and generating a first synchronization-detecting signal;

(e) a latch circuit for latching the content of said shift register with said word clock to generate parallel data;

(f) a second synchronization pattern detecting circuit for detecting a synchronization pattern from said parallel data, and generating a second synchronization-detecting signal; and (g) a frame synchronization detecting circuit for monitoring an interval between detection of synchronization patterns, and generating a frame synchronization indication signal when judging frame synchronization is made;

said first and second synchronization pattern detecting circuits being switched so that said first synchronization pattern detecting circuit is made valid when frame synchronization is not made and said second synchronization pattern detecting circuit is made valid when frame synchronization is made, said frame synchronization detecting circuit receiving a synchronization-detecting signal emitted from said first or second synchronization pattern detecting circuit which is made valid, to thereby monitor an interval between detection of synchronization patterns.

8. The apparatus as set forth in claim 7, wherein said frame synchronization detecting circuit counts the number of said word clocks from first receipt of said synchronization-detecting signal until second receipt of said synchronization-detecting signal, and make judgement that frame synchronization is made only when the counted number of said word clocks is equal to the number of word clocks corresponding to one frame.

9. An apparatus for detecting a synchronizing signal, comprising:

(a) a clock extracting circuit for extracting bit clocks from serial data received in said apparatus;

(b) a shift register for shifting said serial data bit by bit on the basis of said bit clocks;

(c) a synchronization circuit for counting said bit clocks, and generating word clocks in accordance with the number of count of said bit clocks;

(d) a first synchronization pattern detecting circuit for detecting a synchronization pattern from the content of said shift register, and generating a first signal;

(e) a latch circuit for latching the content of said shift register with said word clock to generate parallel data;

(f) a second synchronization pattern detecting circuit for detecting a synchronization pattern from said parallel data, and generating a second signal;

(g) a frame synchronization detecting circuit for determining whether frame synchronization is made or not, by first and second synchronization-detecting signals, and generating a frame synchronization indication signal indicative of whether frame synchronization is made or not;

(h) a first AND circuit receiving said first signal and an inverted signal of said frame synchronization indication signal, and generating said first synchronization-detecting signal;

(i) a second AND circuit receiving said second signal and said frame synchronization indication signal, and generating said second synchronization-detecting signal; and (j) an OR circuit receiving said first and second synchronization-detecting signals, and generating an output signal to said frame synchronization detecting circuit wherein said first and second synchronization pattern detecting circuits are switched in accordance with said frame synchronization indication signal.

10. The apparatus as set forth in claim 9, wherein said first synchronization pattern detecting circuit is enabled to detect a synchronization pattern from said serial data, when frame synchronization is not made, and said second synchronization pattern detecting circuit is enabled to detect a synchronization pattern from said parallel data, when frame synchronization is made.

11. The apparatus as set forth in claim 9, wherein said frame synchronization detecting circuit monitors an interval between detection of synchronization patterns, and generates said frame synchronization indication signal when judging that frame synchronization is made.

12. The apparatus as set forth in claim 11, wherein said frame synchronization detecting circuit counts the number of said word clocks from first receipt until second receipt of said first or second synchronization-detecting signal, and makes judgement that frame synchronization is made only when the counted number of said word clocks is equal to the number of word clocks corresponding to one frame.

13. An apparatus for detecting a synchronizing signal, comprising:

(a) a clock extracting circuit for extracting bit clocks from serial data received in said apparatus;

(b) a shift register for shifting said serial data bit by bit on the basis of said it clocks;

(c) a synchronization circuit for counting said bit clocks, and generating word clocks in accordance with the number of count of said bit clocks;

(d) a first synchronization pattern detecting circuit for detecting a synchronization pattern from the content of said shift register, and generating a first synchronization pattern detecting signal;

(e) a latch circuit for latching the content of said shift register with said word clock to generate parallel data;

(f) a second synchronization pattern detecting circuit for detecting a synchronization pattern from said parallel data, and generating a second synchronization pattern detecting signal;

(g) a frame synchronization detecting circuit for determining whether frame synchronization is made or not, by said first and second synchronization-detecting signals, and generating a frame synchronization indication signal indicative of whether frame synchronization is made or not;

(h) a first input controlling circuit for enabling or disabling the content of said shift register to be transmitted into said first synchronization pattern detecting circuit in accordance with an inverted signal of said frame synchronization indication signal;

(i) a second input controlling circuit for enabling or disabling said parallel data to be transmitted into said second synchronization pattern detecting circuit in accordance with said frame synchronization indication signal; and (j) an OR circuit receiving said first and second synchronization-detecting signals, and generating an output signal to said frame synchronization detecting circuit, wherein said first and second synchronization pattern detecting circuits are switched in accordance with said frame synchronization indication signal.

14. The apparatus as set forth in claim 13, wherein said first synchronization pattern detecting circuit is enabled to detect a synchronization pattern from said serial data, when frame synchronization is not made, and said second synchronization pattern detecting circuit is enabled to detect a synchronization pattern from said parallel data, when frame synchronization is made.

15. The apparatus as set forth in claim 13, wherein said frame synchronization detecting circuit monitors an interval between detection of synchronization patterns, and generates said frame synchronization indication signal when judging that frame synchronization is made.

16. The apparatus as set forth in claim 15, wherein said frame synchronization detecting circuit counts the number of said word clocks from first receipt until second receipt of said first or second synchronization-detecting signal, and makes judgement that frame synchronization is made only when the counted number of said word clocks is equal to the number of word clocks corresponding to one frame.

17. A method of detecting a synchronization signal, comprising the steps of:

(a) attempting to detect a synchronization pattern from a received serial data;

(b) emitting a first synchronization-detecting signal from a first synchronization-detecting circuit, if a synchronization pattern is detected;

(c) monitoring an interval between subsequent first synchronization-detecting signals to judge whether synchronization is made or not;

(d) attempting to detect a synchronization pattern from parallel data derived from said serial data;

(e) emitting a second synchronization-detecting signal from a second synchronization-detecting circuit, if frame synchronization is made, said second synchronization-detecting signal being derived from said parallel data of step (d); and (f) monitoring an interval between subsequent second synchronization-detecting signals to judge whether frame synchronization is made or not.

18. The method as set forth in claim 17, wherein if frame synchronization is judged not to be made in said steps (c) and (f), said steps (a) to (f) are repeated.

19. The method as set forth in claim 17, wherein if frame synchronization is judged to be made in said step (f), said steps (d) to (f) are repeated.

* * * * *